Sept. 29, 1959   F. W. W. MORLEY ET AL   2,906,090
VARIABLE AREA JET PROPULSION NOZZLES FOR JET PROPULSION ENGINES
Filed Aug. 17, 1953   6 Sheets-Sheet 4
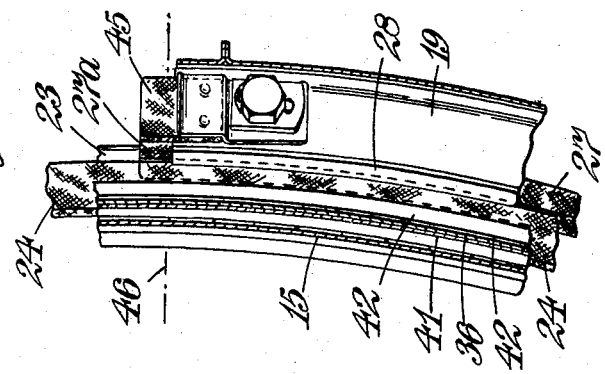
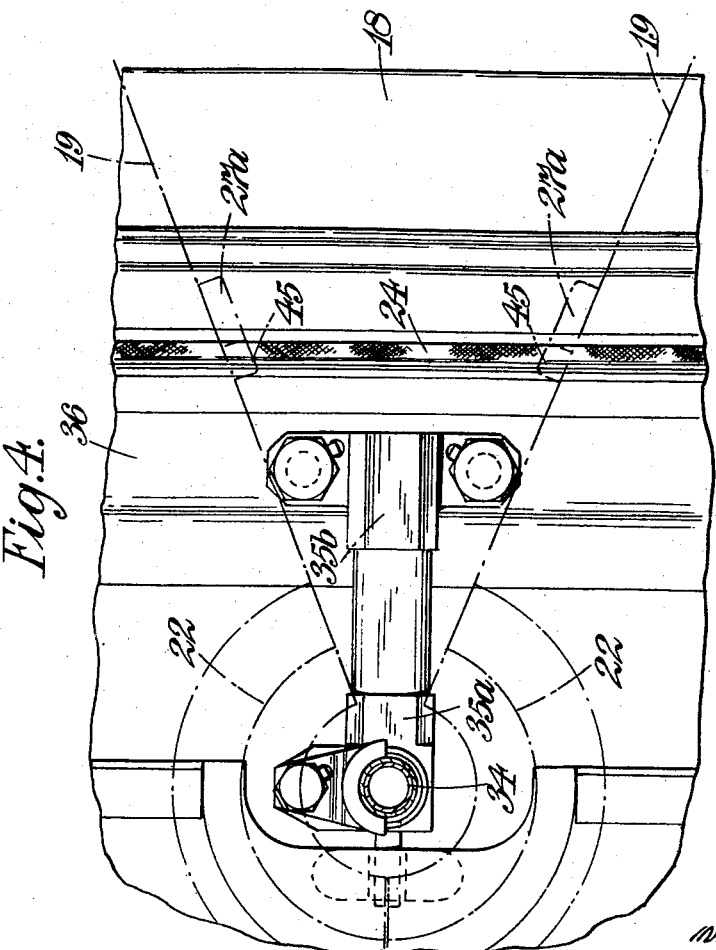
INVENTORS
F. W. W. MORLEY &
P. REDFERN
BY- Wilkinson & Mawhinney
ATTYS.

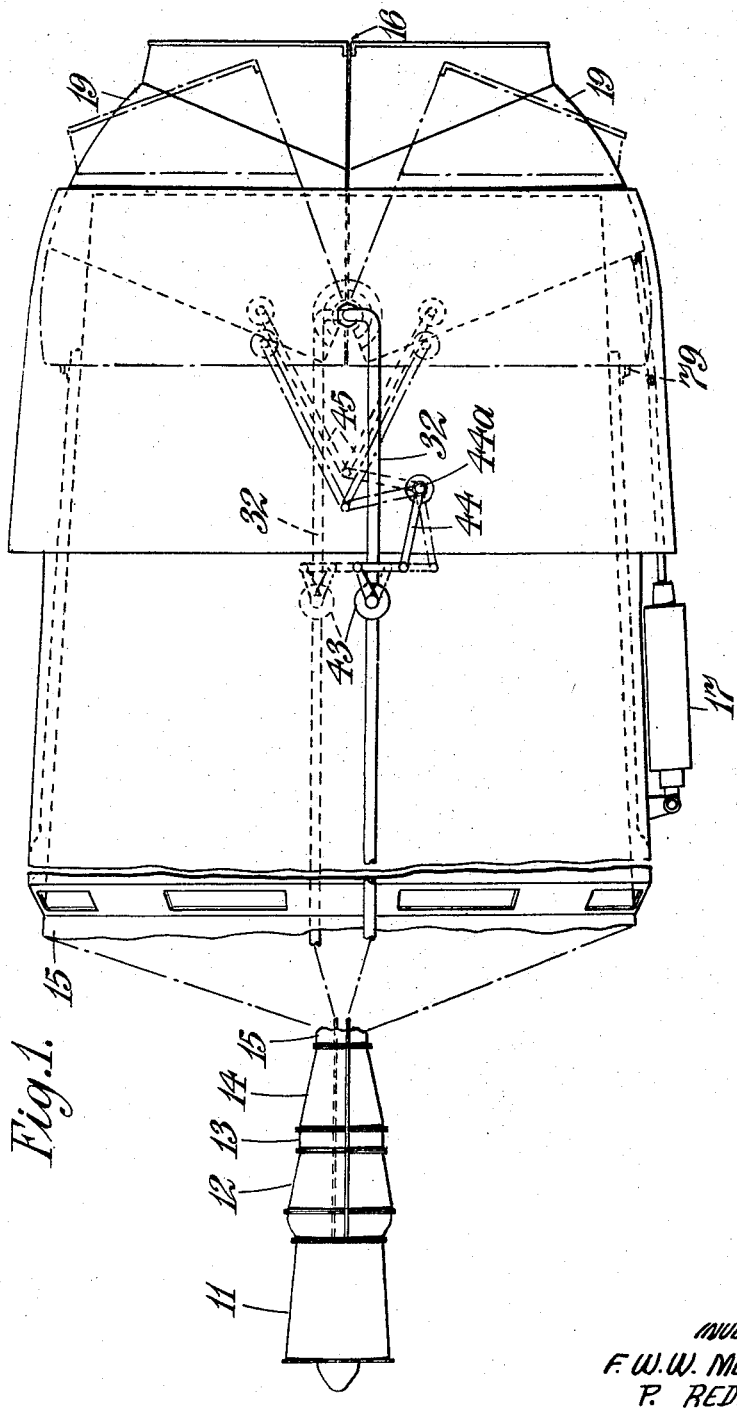

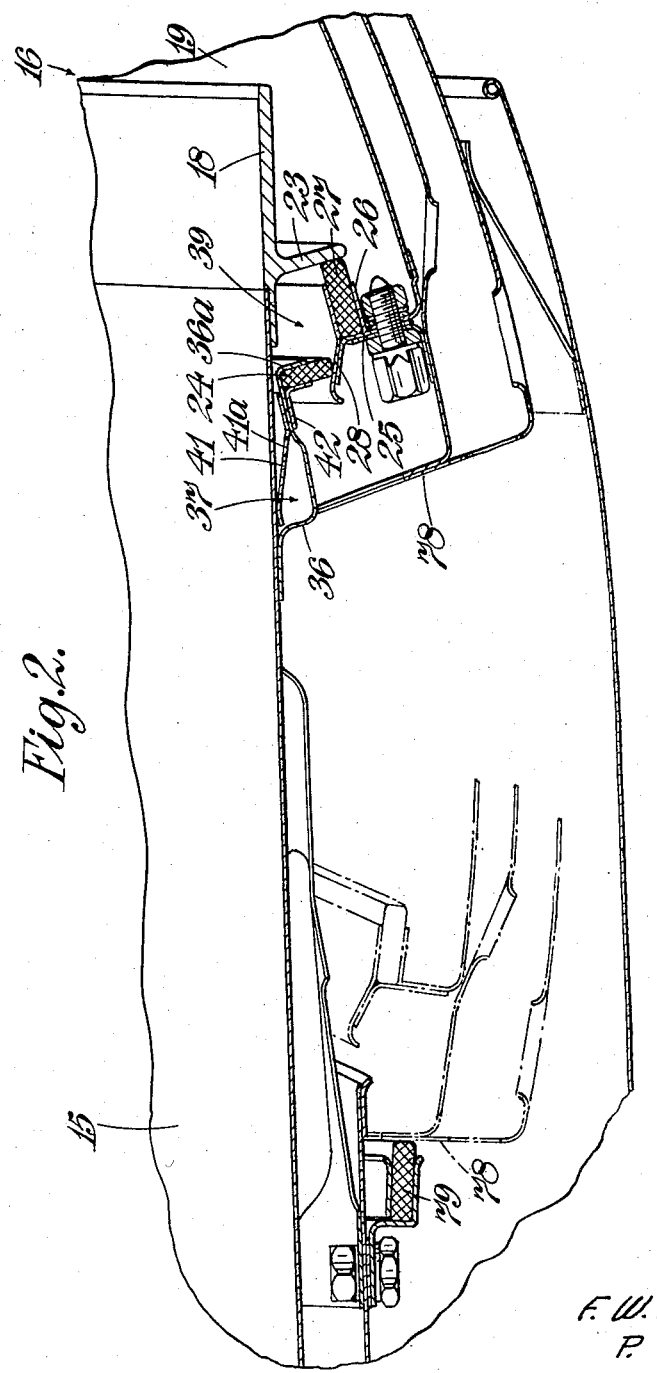

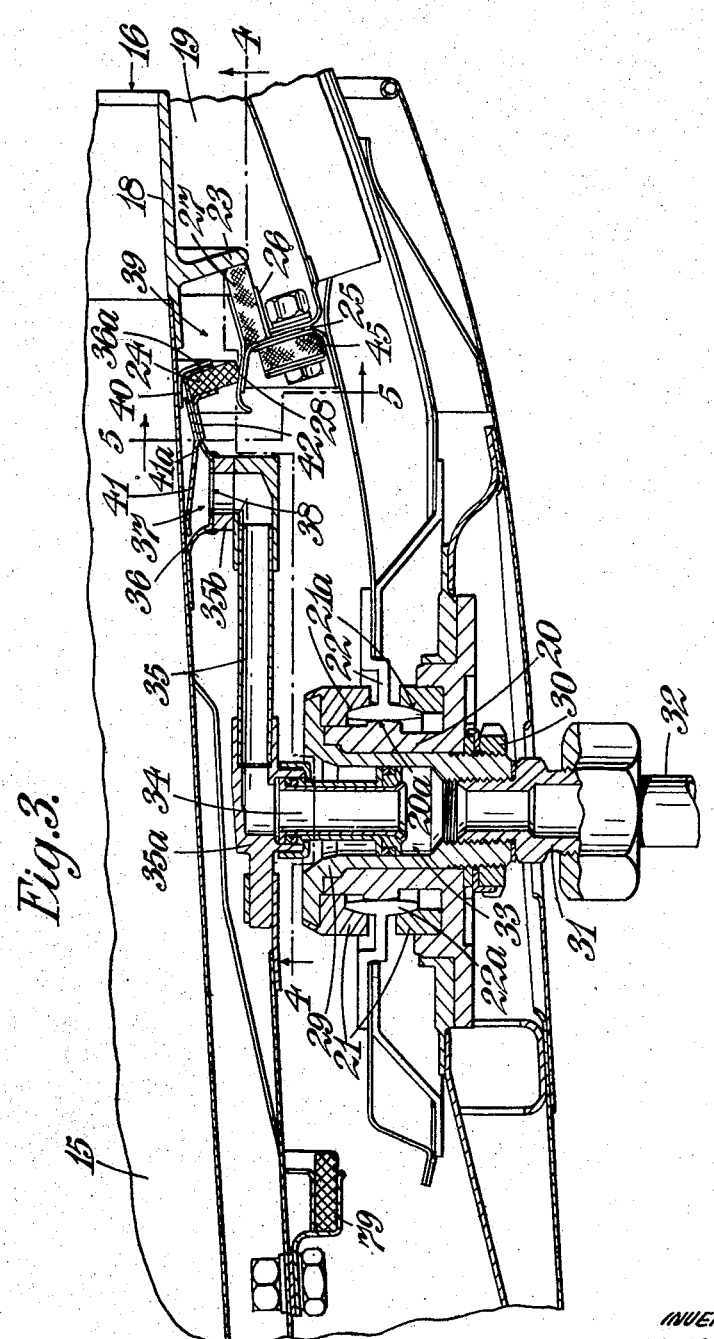

Fig.6.

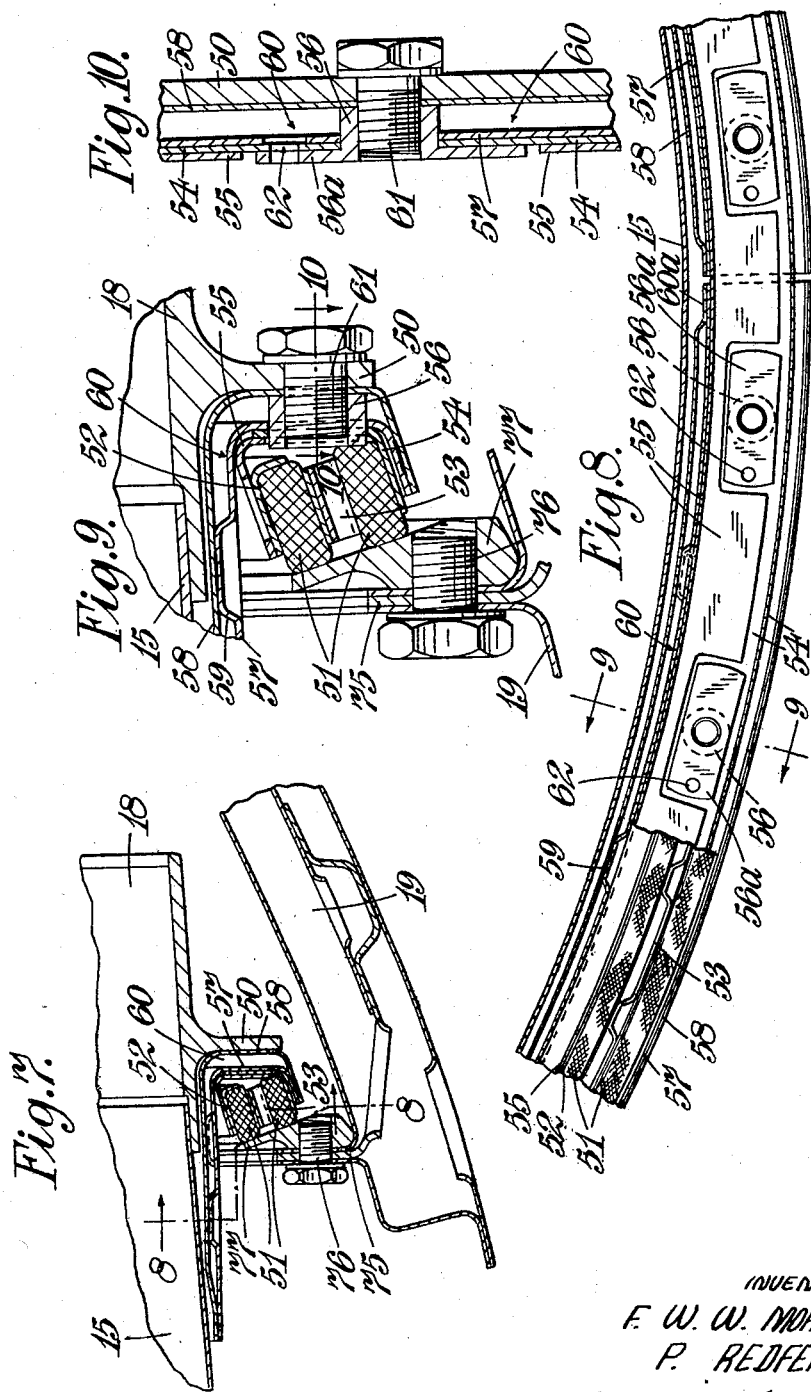

United States Patent Office 2,906,090
Patented Sept. 29, 1959

2,906,090

VARIABLE AREA JET PROPULSION NOZZLES FOR JET PROPULSION ENGINES

Frederick William Walton Morley, Castle Donington, and Peter Redfern, Littleover, England, assignors to Rolls-Royce Limited, Derby, England, a British company Application August 17, 1953, Serial No. 374,592

Claims priority, application Great Britain September 12, 1952

16 Claims. (Cl. 60—35.6)

This invention relates to jet nozzles such as are employed at the outlet ends of jet pipes forming parts of reaction propulsion power plants.

It is well-known to provide a jet nozzle which has a variable outlet area and has adjustable nozzle elements for varying the effective area. In one well-known construction of such variable-area jet nozzle arrangement, the adjustable portions comprise a pair of segmental members pivoted on the jet pipe structure to swing between a retracted position in which they are substantially inoperative and in which a fixed nozzle portion at the outlet end of the jet pipe defines the effective nozzle area, and an extended position in which they define a minimum effective area of the nozzle. It is also well-known to arrange the segmental members so that in the retracted position they are accommodated between the walls of a double-walled jet pipe, which walls form a jacket through which a cooling air flow occurs in operation. In the extended position in such an arrangement the cooling air may be arranged to leave the jacket by flowing through passages in the segmental members.

In such jet nozzle arrangements it is usual to provide gas-sealing devices which are operative between the inner surfaces of the segmental members and the external surface of the fixed nozzle portion so as to prevent hot gases of the jet stream which is flowing through the fixed nozzle portion from leaking in the reverse direction (i.e. the direction opposite to that in which the gases flow to atmosphere) between the fixed nozzle portion and the adjustable segmental members thereby, for instance, to penetrate into the cooling air jacket.

Such gas-sealing devices are normally operative when the segmental members are in the extended position but they may also be employed to be operative in other positions of the segmental members.

This invention has for an object to provide an improved arrangement of such sealing devices whereby the possibility of hot gas leakage is substantially reduced.

According to the present invention, there is provided in a jet nozzle arrangement having adjustable nozzle elements for varying the effective outlet area of the jet nozzle, a gas-sealing device comprising a pair of mechanical seals operative between each adjustable nozzle element and the fixed nozzle portion, said pair of seals being arranged so that any hot gas leakage must occur first past one seal and then past the other seal and being arranged to define a closed space between them, and means to supply air under pressure to said closed space.

Preferably the mechanical seals each comprise parts which come into abutment when the adjustable nozzle elements are moved to an extended position of the nozzle elements. For instance, each seal may comprise a flange on one of the parts of the nozzle arrangement and a braided metal strip carried by the other part and adapted to come into contact with the flange when the adjacent adjustable nozzle element is moved to the extended position.

According to another preferred feature of this invention, in an arrangement in which the adjustable nozzle elements are segmental members pivoted relative to the fixed nozzle portion, the pressure air supply to the closed space may be effected through the pivotal mountings for the segmental members.

According to another feature of this invention, in a jet nozzle arrangement having segmental members which together encircle a fixed nozzle portion, there is provided an annular manifold encircling the fixed nozzle portion and arranged to be supplied with pressure air, for example through a pivotal mounting for the segmental members, and the manifold is connected at a plurality of circumferentially-spaced points with a space which extends between axially spaced gas-seal elements carried on the fixed nozzle portion and which is closed off by corresponding gas-seal elements carried by the segmental members and each cooperating with a gas-seal element on the fixed nozzle portion in the extended position of the segmental members, whereby the space is pressurized.

Two constructions of jet nozzles incorporating the above novel features will now be described by way of example. The description makes reference to the accompanying drawings in which:

Figure 1 is a diagrammatic view of a gas-turbine engine and jet-pipe fitted with an adjustable outlet nozzle, Figure 2 is a sectional view of part of Figure 1 drawn to a larger scale and showing in detail a first construction of sealing means, Figure 3 is a section through one of the bearing supports for the parts of the adjustable outlet nozzle, showing further details of the first construction of sealing means, Figure 4 is a section on the line 4—4 of Figure 3, Figure 5 is a section on the line 5—5 of Figure 3, Figure 6 is a view corresponding to Figure 3 and showing the details of the second construction, Figure 7 is a view of the second construction corresponding to part of Figure 2, Figure 8 is a detail view on the line 8—8 of Figure 7 with part broken away, Figure 9 is a section on the line 9—9 of Figure 8 on an enlarged scale, and Figure 10 is a section on the line 10—10 of Figure 9.

Referring first to Figure 1, there is shown a gas turbine having a compressor 11, combustion equipment 12, and a turbine 13 connected in series, the combustion equipment 12 to receive air from the compressor 11 to have fuel burnt in it and the turbine 13 to receive the hot gases from the combustion equipment 12. The engine also has an exhaust assembly 14 receiving the exhaust gases from the turbine 13 to convey them to a jet pipe 15 having at its outlet end a variable-area nozzle 16 which is adjusted between a minimum area or extended position and a maximum area or retracted position by rams 17.

Referring now to Figures 2 to 10, the construction of the outlet end of the jet pipe 15 is shown in more detail together with two constructions of gas seal.

The outlet end of the jet pipe 15 is formed with a frusto-conical end ring 18 which tapers in the direction of flow and defines the maximum effective orifice area of the nozzle.

The effective orifice area is made adjustable by providing a pair of adjustable part-spherical nozzle elements 19 each of which is mounted in bearing structures to swing about a diameter of the fixed nozzle portion afforded by the end ring 18.

The adjustable nozzle elements 19 swing between a retracted position in which the effective area of the nozzle is defined by the fixed nozzle portion 18 and an extended position in which the adjustable nozzle elements 19 are operative to reduce the effective area of the nozzle.

In each case, the bearing structure comprises at each side of the jet pipe a hollow spindle 20 having formed on its external surface an annular part-spherical bearing surface 20a and a pair of collars 21 encircling the spindle 20 in axially-spaced relation thereto and formed with inwardly-facing part-spherical bearing surfaces 21a. The spindle 20 may either be fixed to stationary structure such as to a shroud encircling the jet pipe, as shown in the construction of Figures 2–5, or may be arranged to be free for movement relative to the jet pipe in a direction substantially parallel to the axis of the jet pipe as described in the specification of application Serial No. 344,978 filed March 27, 1953, now Patent No. 2,840,985, in the name of C. A. Elliott as shown in the construction of Figures 6–10. Each bearing structure also comprises a segmental bearing element 22 attached to each of the adjustable nozzle elements 19. Each segmental bearing element has a flange 22a affording an inwardly-facing part-spherical bearing surface to co-operate with the annular bearing surface 20a on the spindle 20 and a pair of axially-spaced outwardly-facing part-spherical bearing surfaces to co-operate with the bearing surfaces 21a on the collars 21. The collars 21 serve to retain the adjustable nozzle elements 19 in position in the bearing structure. The angular extent of the segmental bearing elements 22 is shown in Figure 4 in chain lines and is such as to allow the swinging of the adjustable nozzle elements 19, and the circumferentially-facing ends of the segmental bearing elements may form abutments to limit the extent of the swinging of the adjustable nozzle elements 19.

Referring now to Figures 2 to 5, the end ring 18, which defines the maximum effective area of the nozzle arrangement, is provided externally with an outwardly-extending annular flange 23 of frusto-conical form and the adjacent portion of the skin of the jet pipe 15 has extending around it an annular outwardly-extending sealing strip 24 which is conveniently formed of braided heat-resistant metal.

Each of the adjustable nozzle elements 19 has secured to its internal surface an inwardly-projecting circumferentially-extending flange 25 which is formed at its inner edge with a channel portion 26 which extends substantially parallel to the internal surface of the adjustable nozzle element 19 and the channel has fitted in it a sealing strip 27 which may also be formed from braided heat-resisting metal. The flange 25 and channel portion 26 are so shaped and positioned that when the adjustable nozzle segment 19 is in the extended position (as seen in full lines in Figures 2 and 3) the sealing strip 27 fitted in the channel 26 comes up against the outwardly-projecting frusto-conical flange 23 on the end ring 18. Each nozzle segment 19 also has at the inner edge of the flange 25 an axially extending portion 28 which projects in the opposite direction to the channel portion 26 and this axially-extending portion 28 makes an angle with the internal surface of element 19 and is arranged to come into contact with the outwardly-extending sealing strip 24 mounted on the outside of the jet pipe 15 when the nozzle segment 19 is in the extended position. The sealing strip 24 may be inclined to the radial direction, or the axially-extending portion 28 may be of frusto-conical form, or both, so that a good contact between the sealing strip 24 and the axially-extending portion 28 may be maintained.

There is thus provided a pair of gas-seals between the outlet end of the jet pipe 15 and the internal surface of each adjustable nozzle element 19, the one seal being formed by the flange 23 on the end ring 18 and the braided sealing strip 27 carried by the nozzle element 19 and the other seal being formed by the braided sealing strip 24 on the jet pipe and the axial flange 28 on the adjustable nozzle element 19, and these seals act to restrict the leakage flow of hot gas from the jet stream in a reverse direction between the inner surface of the adjustable nozzle elements 19 and the external surface of the end ring 18 and jet-pipe 15.

Any tendency for hot gas to leak past these two sealing devices is further restricted by arranging that the space enclosed by the two seals 23, 27 and 24, 28 is pressurized with pressure air.

This may be achieved as shown. One or both spindles 20 may be hollow and receive bolt member 29 which receives a nut 30 to hold the parts of the bearing together and the outer end of the bolt member 29 may be fitted with a threaded union 31 to which is connected a pressure air supply pipe 32. The union 31 leads to a bore 33 in the bolt member and the opposite end of the bore 33 is connected through a transfer pipe 34 to a conduit 35 which extends rearwardly from the bearing structure towards the location of the two seals. The rearwardly-extending conduits 35 may each comprise two elbows 35a, 35b interconnected by a length of tube. The transfer pipe 34 has sliding gas-sealing engagement with a socket of the elbow 35a and with the surface of the bore 33. The other elbow 35b may be welded to an annular sheet-metal channel-section strip 36 which is welded to the jet pipe 15 at one edge and is formed at its opposite edge with an out-turned flange 36a affording one retaining flange for the outwardly-extending braided metal sealing strip 24. The other retaining flange is formed by an angle strip 42. Air may be delivered from elbow 35b into the space 37 between the annular sheet-metal channel-section strip 36 and the jet pipe 15 through an aperture 38 in the base of the channel of the strip 36. The air thus delivered to said space 37 flows circumferentially round the space and then through apertures 41a in heat shield strip 41 (see Figure 2) rearwardly into the space 39 between the outwardly-directed flange 23 on the end ring 18 and the outwardly-directed braided metal sealing strip 24, so that when the adjustable nozzle elements 19 are in their extended position the space 39 between the two seals 23, 27 and 24, 28 becomes pressurised.

The edge of the sheet-metal strip 36 which carries the flange 36a for retaining the outwardly-directed braided metal seal strip 24 is spaced from the jet pipe 15 by a series of circumferentially-spaced angle-section strips 40 of which one flange is in contact with the jet pipe 15 and of which the other flange is welded to the out-turned flange 36a of the channel-section strip 36, and in this case the air delivered into the space 37 between the channel-section strip 36 and the jet pipe 15 flows into the space 39 between the two seals 23, 27 and 24, 28 through the gaps between adjacent angle-section strips 40.

The elbow 35b where it cooperates with aperture 38 may be threaded to receive a restrictor for the purpose of regulating the air flow when the parts of the seals 23, 27 and 24, 28 are engaged.

In addition, a valve 43 may be provided to control the flow of air through the pressure air supply pipe 32, and this valve 43 may be connected through bell crank levers 44 pivoted at 44a to the synchronising links 45 interconnecting nozzle elements 19 so that the valve 43 is opened to permit a supply of air to the space between the seals 23, 27 and 24, 28 when the nozzle elements 19 are moved to the extended position in which they define the minimum nozzle area.

The adjacent edges of the nozzle segments 19, which may be substantially semi-circular in transverse section, are provided with seals which come together in the extended position to prevent leakage of pressure air from space 39 between the abutting ends of elements 19. The braided strip 27 is, as seen at 27a in Figures 4 and 5, arranged to project beyond the line of contact 46 of the elements 19 so as to be compressed in the extended nozzle position and prevent leakage to the downstream side of flange 23 from the space 39 at the ends of the sealing strips 27. Also short sealing strips 45 are carried on the ends of the nozzle elements 19 to prevent leakage of hot gas around the seals 23, 27 and 24, 28 at the line of contact 46, into the space between the jet pipe 15 and the nozzle elements 19 adjacent their supporting bearing structure.

Referring now to Figures 6 to 10, the end ring 18 is in this construction provided with a radial flange 50 which is arranged to support in radially-spaced relation a pair of annular braided metal sealing strips 51 and also to support manifold means for supplying pressure air to the space between two sealing strips 51.

One of the sealing strips 51 is welded to one flange of a corresponding angle section strip 52 and the other of the sealing strips 51 has welded to its opposite face a corrugated metal strip 53 which acts as a spacer for the two sealing strips 51. The two sealing strips 51 and the spacer 53 are compressed between two flanges of two further angle-section strips 54, 55, of which the base flanges overlap and are welded together so that the two strips virtually form a channel section member. The base flange of the angle strip 55 is cut away to receive circumferential flanges 56a of the bosses 56 welded to the base flange of the angle strip 54, and the bosses 56 are internally threaded.

The manifold means is formed in two parts, one part associated with each of the two support spindles 20 of the bearing structure for the adjustable nozzle elements 19. Each manifold part extends from the bearing structure, which is on the horizontal centre-line, circumferentially in both directions to adjacent the central vertical plane of the jet nozzle.

Each part of the manifold means is formed from two semi-circular metal strips 57, 58 of channel-section, of which the base portions are substantially radial and spaced apart, the strip 57 lying within the strip 58. The channel-section strips 57, 58 are welded together along the free edges of their radially-spaced side flanges and are not only spaced apart along the base portions but also over the major part of their radially inner side flanges, as by dimples 59 formed in one of the strips 57 or 58. The manifold part associated with each spindle 20 thus has a distribution space 60 which is semi-circular and is of L-section.

The radially inner side flanges of the manifold means are longer than the base portions, and thus the longer limb of space 60 extends axially and the shorter limb formed between the base portions extends radially outwards.

The manifold parts 57, 58 and the sealing strips 51 are supported from the radial flange 50 on the end ring 18 of the jet pipe by the internally-threaded bosses 56 extending through apertures in the inner channel-section strip 57 forming the manifold and abutting the channel-section strip 58. Setscrews 61 pass through the radial flange 50 on the end ring 18 and through apertures in the outer channel-section strip 58 to engage in the threaded bores of the bosses 56 to retain the assembly against the radial flange 50. The joined angle-section strips 54, 55 between which the sealing strips 51 are carried are so formed that their angles are pulled up into contact with the inner channel-section strip 57 by tightening of the setscrews 61 in the bosses 56, thereby to prevent leakage of air from the manifold space 60. Aligned holes 62 are provided in the flanges 56a of the bosses 56 and in the strips 54, 57 to allow compressed air supplied to the manifold space 60 to flow from it to the space between the two sealing strips 51. The space between the strips 51 is closed off at each of its circumferential ends by a solid block secured to the corrugated strip 53 and to angle strips 54, 55, and the circumferential ends of manifold 60 are closed off by joggling as shown at 60a (Figure 8).

As in the previous construction compressed air is supplied to the manifold through the hollow spindles 20 of the bearing structure for the adjustable nozzle elements 19.

In this construction, each spindle 20 has a hollow bolt member 63 passing through it and the bolt member has one of the collars 21 formed integral with its head 64, this collar 21 affording one of the inwardly-directed bearing surfaces 21a to cooperate with the flange 22a, the other such surface 21a being formed on a collar 21 held in place by a nut 65 threaded on the bolt member 63. The spindle 20 and collar 21 are both rotatively secured to bolt member 63 by means of key 63a, and collar 21 may be formed with a radius arm having a hollow boss receiving a pivot pin which is carried in bearings in fixed structure to allow bolt member 63 and spindle 20 to move in a direction substantially parallel to the axis of the jet pipe, as set forth in specification of Application Serial No. 344,978 filed March 27, 1953, now Patent No. 2,840,985 in the name of C. A. Elliott.

The bolt member 63 has its ends provided with elbows 66, 67, the outer 66 of which affords a compressed air supply connection and the inner 67 of which faces rearwardly and affords a socket in which is slidably engaged in gas-sealing manner a length of pipe 68 which at its opposite end engages in a similar manner with a further elbow 69 which is secured to a boss 70 welded to the adjacent manifold part to surround an aperture 71 in the wall 57 thereof. A washer 72 is trapped between the boss 70 and the elbow 69 and welded in position, and the washer may have in it a hole of predetermined size to act as a restrictor for preventing excessive flow of air through the pressurising arrangement. The elbow 66 is connected with the compressed air supply pipe 32 by a short length of pipe 73 having a gas-sealing sliding engagement with both the elbow 66 and an enlarged bore portion 74 of the pipe 32, to allow for axial movement of elbow 66 relative to fixed pipe 32. As in the previous construction, a valve 43 may be provided to control the supply of air under pressure.

Each of the adjustable nozzle elements 19 is made of sheet metal and has formed on its inner surface a radial flange 75 to which is secured by setscrews 76 a part-annular member 77 which, when the adjustable nozzle elements 19 are in their fully extended position (as shown), bears against the two sealing strips 51 carried by the flange 50 on the end ring 18, thereby to form a closed space between these two sealing strips 51. Thus, when the adjustable nozzle elements 19 are in their fully extended position, the space between the sealing strips 51 becomes pressurized and the leakage of hot gas from the exhaust gas stream between the inner surface of the adjustable nozzle elements 19 and the outer surface of the end ring 18 is prevented.

The retracted position of the elements 19 is indicated in chain lines in Figure 2 for the first-described construction and in this position a further seal may be completed between flanges 78 on the nozzle elements 19 coming up against a braided metal strip 79. Such a seal does not, however, form part of this invention.

We claim:

1. A jet nozzle arrangement comprising a fixed nozzle portion; nozzle segments encircling said fixed nozzle portion in spaced relation thereto and arranged for adjustment to vary the effective area of the jet nozzle arrangement to and from a minimum effective area position; pivot means supporting said nozzle segments; sealing means operative at least when said adjustable nozzle segments are in the minimum effective area position to seal the space between said fixed nozzle portion and said adjustable nozzle segments, said sealing means comprising first and second sealing members mounted in spaced relation on said fixed nozzle portion, and co-operating sealing members mounted on said adjustable portions and adapted to come into sealing contact with said first and second sealing members when said adjustable nozzle segments are extended to the minimum effective area position, and said sealing members and a part of said fixed nozzle portion together forming a closed chamber, an annular manifold encircling said fixed nozzle portion, and conduit means extending coaxially through the pivot means and connected at one end to have compressed air supplied thereto and connected at the opposite end to said manifold to supply compressed air thereto, said annular manifold being connected to said closed chamber thereby to pressurize it and to prevent leakage of hot gas between the sealing members.

2. A jet nozzle arrangement as claimed in claim 1, comprising also valve means to control the supply of pressure air through said conduit means to said annular manifold.

3. A jet nozzle arrangement as claimed in claim 2, comprising also power means connected to adjust said nozzle segments about the pivot means and connected simultaneously to operate said valve means to open the valve means when said nozzle elements are moved to the minimum effective area position.

4. A jet nozzle arrangement as claimed in claim 1, comprising compressed air supply means including a pressure air supply connection leading to said one end of said conduit means, and means preventing excessive loss of compressed air when said adjustable nozzle segments are in positions in which the cooperating sealing members on the segments are out of contact with the first and second sealing members comprising a flow restrictor in said pressure air supply connection.

5. A jet nozzle arrangement comprising a fixed nozzle portion; nozzle segments encircling said fixed nozzle portion in spaced relation thereto and arranged for adjustment to vary the effective area of the jet nozzle arrangement to and from a minimum effective area position of the jet nozzle; pivot means supporting said nozzle segments for said adjustment; sealing means operative at least when said adjustable nozzle segments are adjusted to said minimum area position to provide a gas seal in the space between said fixed nozzle portion and said adjustable nozzle segments, said sealing means comprising first and second sealing members mounted in spaced relation on said fixed nozzle portion, and third and fourth sealing members mounted in spaced relation on each of said nozzle segments, the third sealing members being in contact with said first sealing member and the fourth sealing members being in contact with said second sealing member when said adjustable nozzle segments are adjusted to the minimum effective area position thereby to define a closed chamber, and means to supply compressed air to said closed chamber to pressurize it to prevent leakage of hot gas between the sealing members, said compressed air supply means including manifold means encircling the fixed nozzle portion and connected with said closed space at a plurality of circumferentially spaced points.

6. A jet nozzle arrangement as claimed in claim 5, wherein one of each pair of contacting sealing members comprises a rigid flange and the other sealing member of the contacting pair comprises a braided metal strip.

7. A jet nozzle arrangement as claimed in claim 6, wherein the rigid flange sealing member of one contacting pair and the braided metal strip sealing member of the other contacting pair are secured in axially-spaced relation on said fixed nozzle portion to encircle it and the other braided metal and rigid flange sealing members are mounted internally of the nozzle segments.

8. A jet nozzle arrangement as claimed in claim 7, wherein the braided metal and rigid flange sealing members of the fixed nozzle portion extend outwardly therefrom, the rigid flange sealing member being frusto-conical, and wherein the braided metal sealing members carried by the nozzle segments extend substantially parallel to the internal surface of the nozzle segments in one direction and the rigid flange sealing members carried by the nozzle segments extend in the opposite direction.

9. A jet nozzle arrangement as claimed in claim 5, wherein said first and second sealing members are afforded by a pair of braided metal strips supported on the fixed nozzle portion in radially-spaced relation and encircling the fixed nozzle portion and the third and fourth sealing members are provided by spaced parts of flange elements extending inwardly from the internal surfaces of the nozzle segments, said flange parts being adapted to come into contact simultaneously with the radially-spaced braided metal strips in said mininmum effective area position of the nozzle segments thereby to close-off the space between the braided metal strips.

10. A jet nozzle arrangement as claimed in claim 9, comprising a channel-section member encircling the fixed nozzle portion and having a radially-extending base portion and a pair of side walls extending substantially axially from said base portion, the pair of braided metal strips being secured to the side walls respectively, and a corrugated strip accommodated within the channel-section member and between the braided metal strips to hold them in spaced relation, said means to supply compressed air being connected to deliver to the space between the side walls of said channel-section member.

11. A jet nozzle arrangement as claimed in claim 5, wherein said manifold means comprises a pair of channel-section members secured together in nested relation with their bases and a pair of their side flanges spaced apart and jointed together at the edges of their side flanges, and wherein the first and second sealing members are secured in spaced relation to the base of the inner channel-section member, there being apertures connecting the space between the seal parts and the space between the base portions of the channel-section members and there being a pressure air supply connection to the space enclosed by the channel-section members.

12. A jet nozzle arrangement as claimed in claim 5, wherein said manifold means comprises a strip encircling the fixed nozzle portion and in spaced relation thereto and having one edge secured to the fixed nozzle portion and carrying at its opposite edge one of the sealing members mounted on the fixed nozzle portion, the space between the fixed nozzle portion and said strip being in communication with the closed chamber, and there being a pressure air supply connection to said space between the strip and the fixed nozzle portion.

13. A jet nozzle arrangement as claimed in claim 5, wherein said means to supply compresesd air to the closed chamber comprises a duct member extending coaxially through the pivot means of the nozzle segments, said duct member being connected at its inner end to the manifold means.

14. A jet nozzle arrangement comprising a fixed nozzle portion; nozzle segments encircling said fixed nozzle portion in spaced relation thereto and arranged for adjustment to vary the effective area of the jet nozzle arrangement to and from a minimum effective area position of the jet nozzle; pivot means supporting said nozzle segments for said adjustment; sealing means operative at least when said adjustable nozzle segments are adjusted to said minimum area position to provide a gas seal in the space between said fixed nozzle portion and said adjustable nozzle segments, said sealing means comprising first and second sealing members mounted in spaced relation on said fixed nozzle portion, and third and fourth sealing members mounted in spaced relation on each of said nozzle segments, the third sealing members being in contact with said first sealing member and the fourth sealing members being in contact with said second sealing member when said adjustable nozzle segments are adjusted to the minimum effective area position thereby to define a closed chamber, and means to supply compressed air to said closed chamber to pressurize it to prevent leakage of hot gas between the sealing members said compressed air supply means including manifold means encircling the fixed nozzle portion and connected with said closed space at a plurality of circumferentially-spaced points, a pressure air supply connection connected to said manifold means and valve means in said supply connection controlling the supply of air to the manifold means through said supply connection.

15. A jet nozzle arrangement as claimed in claim 14, comprising also power means connected to adjust said nozzle segments about the pivot means and connected simultaneously to operate said valve means to open the valve means when said nozzle elements are moved to the minimum effective area position.

16. A jet nozzle arrangement comprising a fixed nozzle portion; nozzle segments encircling said fixed nozzle portion in spaced relation thereto and arranged for adjustment to vary the effective area of the jet nozzle arrangement to and from a minimum effective area position; pivot means supporting said nozzle segments; sealing means operative at least when said adjustable nozzle segments are in the minimum effective area position to seal the space between said fixed nozzle portion and said adjustable nozzle segments, said sealing means comprising first and second sealing members mounted in spaced relation on said fixed nozzle portion, and cooperating sealing members mounted on said adjustable portions and adapted to come into sealing contact with said first and second sealing members when said adjustable nozzle segments are extended to the minimum effective area position, and said sealing members and a part of said fixed nozzle portion together forming a closed chamber, means including a pressure air supply connection to supply compressed air to said closed chamber to pressurized it to prevent leakage of hot gas between the sealing members, and means preventing excessive loss of compressed air when said adjustable nozzle segments are in positions in which the cooperating sealing members on the segments are out of contact with the first and second sealing members including valve means in said pressure air supply connection and an operating connection linking the valve means and the nozzle segments in the sense to open the valve means when the nozzle segments are moved to their minimum effective area positions and to close the valve means when the nozzle segments are moved from their minimum effective area positions.

References Cited in the file of this patent

UNITED STATES PATENTS

| | | |
|---|---|---|
| 2,281,195 | Jacobs | Apr. 28, 1942 |
| 2,427,656 | Blom | Sept. 23, 1947 |
| 2,565,854 | Johnstone et al. | Aug. 28, 1951 |
| 2,603,060 | Brown | July 15, 1952 |
| 2,630,673 | Woll | Mar. 10, 1953 |
| 2,635,419 | Ambrose et al. | Apr. 21, 1953 |
| 2,637,972 | Laucher | May 12, 1953 |
| 2,639,171 | Johnson | May 19, 1953 |
| 2,639,579 | Willgoos | May 26, 1953 |
| 2,699,645 | Oulianoff et al. | Jan. 18, 1955 |
| 2,722,801 | Lombard | Nov. 8, 1955 |
| 2,744,773 | Cliborn | May 8, 1956 |
| 2,793,491 | Gardiner | May 28, 1957 |